United States Patent [19]

Akimoto et al.

[11] 4,358,494
[45] Nov. 9, 1982

[54] PROCESS FOR THE PREPARATION OF PAPER-BACKED ADHESIVE TAPES OF THE PRESSURE-SENSITIVE TYPE

[75] Inventors: Saburo Akimoto, Yokohama; Sachio Maruchi, Tokyo; Masahiro Fukaya, Chiba; Tomishi Shibano, Tama; Ippei Chimura, Kamakura; Hiroshi Asakura, Kamakura; Keisuke Kitazume, Kamakura; Shiro Fuse, Kamakura, all of Japan

[73] Assignees: Sanyo-Kokusaku Pulp Co.; Toyo Chemical Co., Ltd., both of Kamakura, Japan

[21] Appl. No.: 104,865

[22] Filed: Dec. 18, 1979

[30] Foreign Application Priority Data

Dec. 21, 1978 [JP] Japan .................. 53/156826

[51] Int. Cl.³ .............................................. B32B 7/02
[52] U.S. Cl. ............................ 428/40; 156/244.17; 156/327; 427/208; 427/208.4; 427/208.8; 428/212; 428/342; 428/343; 428/345; 428/352; 428/354; 428/335; 428/516; 428/906
[58] Field of Search .................. 428/40, 41, 42, 332, 428/514, 516, 520, 335, 216, 218, 343.5, 354, 910, 341, 2, 355, 352, 353, 212, 906; 427/208, 40, 41, 208.4, 208.8; 156/244.27, 244.17, 327

[56] References Cited

U.S. PATENT DOCUMENTS

| | | | |
|---|---|---|---|
| 3,231,419 | 1/1966 | Korpman | 427/208.8 |
| 3,812,005 | 5/1974 | Katagiri et al. | 427/208.4 |
| 4,035,218 | 7/1977 | Yount | 427/208.4 X |
| 4,151,319 | 4/1979 | Sackoff et al. | 427/208.4 |
| 4,188,439 | 12/1980 | Asakura et al. | 428/215 |

Primary Examiner—Michael R. Lusignan
Attorney, Agent, or Firm—Oblon, Fisher, Spivak, McClelland & Maier

[57] ABSTRACT

A widthwise-stretched film is lap-sealed on one side of a backing paper, and polyethylene is extruded and coated on the surface of said film to form a release layer thereon. A pressure-sensitive adhesive composed mainly of polyacrylic ester is then coated on the other side of the backing paper. In this manner, a paper-backed adhesive tape of the pressure-sensitive type is prepared.

12 Claims, 2 Drawing Figures

PROCESS FOR THE PREPARATION OF PAPER-BACKED ADHESIVE TAPES OF THE PRESSURE-SENSITIVE TYPE

BACKGROUND OF THE INVENTION

The present invention relates to a process for the preparation of paper-backed adhesive tapes which excel in the widthwise strength and is easily torn in the widthwise direction even by hand.

By way of example, reference is made to a corrugated box. A variety of adhesive tapes are used for sealing the flaps of a corrugated box. Among others, a typical adhesive tape is a cloth-backed adhesive tape.

The cloth-backed adhesive tape excels in the widthwise strength and possesses a so-called "widthwise tearing property" that permits easy tearing of the tape at a right angle to the lengthwise direction by hand but without using cutters or the like means. Comparing to the paper-backed tape of which backing is coated with silicone as release agent, the cloth-backed tape is able to lap-seal and the surface of the tape exposed to the atmosphere (hereinafter referred simply to as "the tape back") possesses a great slip resistance, so that when several corrugated boxed each being sealed at its flaps with such tapes are placed with one on top of another, they are very difficult to disjoint. In addition, the tape back sufficiently receives a kind of oily marking ink, e.g., sold under the trade mark "Magic Ink", and permits relatively easy unwinding. Thus, the cloth-backed adhesive tape has a number of advantages; however, it offers some proplems from an economical point of view.

Another representative tape is a kraft paper-backed adhesive tape. This type of an adhesive tape has some advantages that it is inexpensive as compared with the above-mentioned cloth-backed adhesive tape and is very easy to unwind. With this tape, however, difficulties are encountered in packaging of articles since it is difficult for an user to tear linearly the tape at an angle normal to the lengthwise direction thereof. In addition, this tape is disadvantageously in that it is not able to lap-seal, and its back possesses a considerably low slip resistance, so that when several corrugated boxed each being sealed at its flaps are placed with one on top of another, they are apt to disjoint, and its back exhibits a poor ink-receptibel property.

It should be noted that the term "lap-sealing property" used hereinafter indicates that the tape is able to lap-seal.

Attempts have been made at providing the properties inherent in the cloth-backed adhesive tape to the kraft paper-backed tape by scoring or perforating the tape in the widthwise direction such that it can linearly be torn along said score or perforation. However, when perforating the tape in the widthwise direction, the tape merely tears along the perforation which then results in a drop of the tape strength in the longitudinal, i.e., lengthwise direction. Thus, such attempts cause another defect and produce no satisfactory results.

Still another type of an adhesive tape supported on a variety of plastic films is disadvantageous in that it is apt to tear when there are projections or protrusions on an application surface. It is also difficult to tear the tape at the widthwise direction. No application of suitable release treatment results in difficulties in the unwind of the tape. Furthermore, it is difficult to pull this tape by a force applied to its end due to its thin thickness.

If the plastic film used is sufficiently stretched in the direction normal to the lengthwise direction, then the obtained adhesive tape is easy to tear in the widthwise, but exhibits a very poor lengthwise strength.

In what follows, reference will be made to the paper-backed tapes having a part of the characteristics of the aforesaid cloth-backed adhesive tapes and capable of being prepared at a low cost. Such tapes include a paper-backed adhesive tape prepared by laminating a polyethylene film oriented in the widthwise direction (The film thus obtained is hereinafter reffered to as the widthwise stretched film.) on one surface of a backing paper and coating a pressure-sensitive adhesive on the opposite surface of the backing paper. In effect, this adhesive tape can be prepared according to the teaching of Japanese Patent Application laid open for public inspection under No. 81543/1978.

However, unless the tape back is subjected to suitable release treatment or the bond strength of the pressure-sensitive adhesive is allowed to drop to an extremely low level, then said tape is so unsatisfactorily unwindable that the tape itself undergoes destruction due to delamination. When neither sufficient delamination strength nor suitable release treatment is applied to the backing paper, similar difficulties are encountered as experienced in Japanese Utility Model Publication Nos. 35589/1978 and 35591/1978.

The release treatment gives rises to decreases in the slip resistance, ink-receptible property, lap-sealing property and the like. When use is made of a pressure-sensitive adhesive having a limited bond strength, difficulties are encountered in sealing of, for instance, a corrugated box; the corrugated box is so insufficiently sealed that the sealed portions will be unsealed later.

Still another type of a paper-backed adhesive tape is proposed so as to obviate the disadvantages of said kraft paper-backed adhesive tape. Such a tape can be prepared by extruding and coating polyethylene on one surface of a backing paper at an extrusion temperature of 250° to 290° C. prevailing at the outlets of die lips and coating a pressure-sensitive adhesive composed mainly of polyacrylic ester on the opposite surface of the backing paper according to the method disclosed in Japanese Patent Publication No. 20205/1976. However, difficulties are still encountered when tearing this tape in the widthwise direction.

Various attempts have been made to propose adhesive tapes which have all the advantages of the prior art cloth-backed adhesive tape, and which can be prepared in a easy and inexpensive manner as compared therewith; however, satisfactory results are not still obtained.

SUMMARY OF THE INVENTION

As a consequence of extensive investigations undertaken with respect to the above-mentioned adhesive tapes, the present inventors have accomplished the adhesive tape products from which are removed the disadvantages necessarily associated with each of the adhesive tapes already proposed. These novel adhesive tapes can easily be prepared at a low cost.

That is to say, the present invention makes it possible to prepare a novel paper-backed adhesive tape in a easy and economical manner, which excels in the lap-sealing property, slip resistance, ink-receptible property, unwind ability and widthwise strength.

According to the present invention, as the backing paper use may be made of that employed in the prior art kraft paper- or Japanese paper-backed adhesive tape without being subjected to any processing. More particularly, according to the present invention, there is provided an economical process for easily preparing a paper-backed adhesive tape having all the properties inhering in the cloth-backed adhesive tape, which comprises the steps of lap-sealing a widthwise stretched film on one side of backing paper using adhesives such as polyethylene and the like, extruding and coating polyethylene on the surface of said film to form a unwind layer thereon and coating a pressure-sensitive adhesive composed mainly of polyacrylic ester on the other side of the backing paper, and in which the delamination strength of said backing paper is adjested to a specific range.

BRIEF DESCRIPTION OF THE DRAWINGS

Other and further features and advantages of the present invention will be apparent to one skilled in the art from the following description and examples, taken along together the drawings wherein.

DESCRIPTION OF THE PREFERRED EMBODIMENTS

Figure 1:
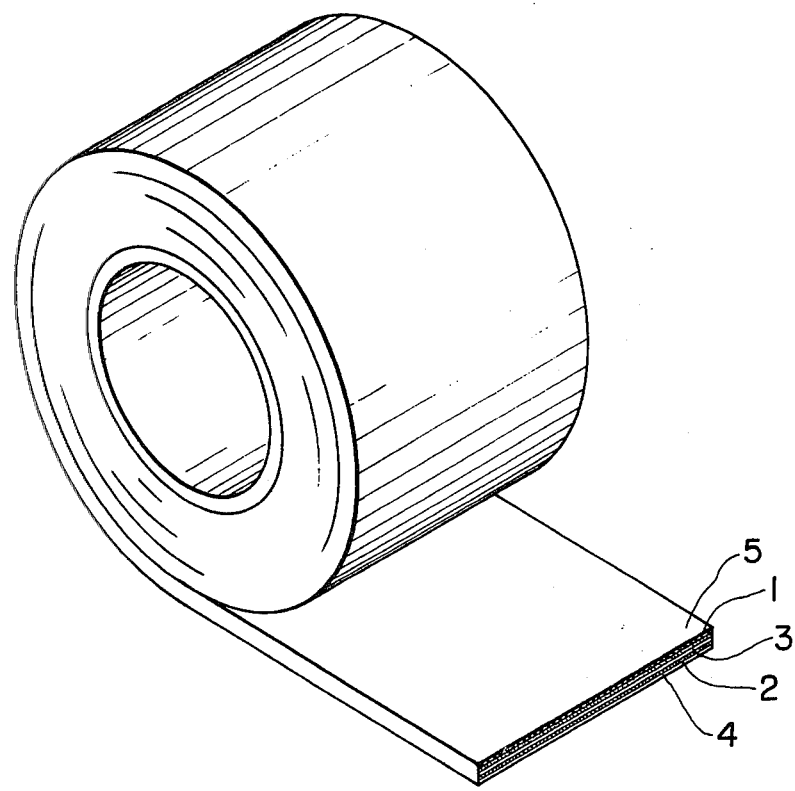
FIG. 1 is a perspective view of one typical embodiment of the paper-backed adhesive tapes according to the present invention.
Figure 2:
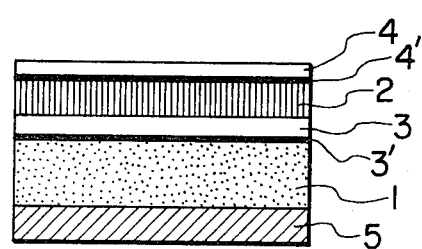
FIG. 2 is an enlarged section view of said embodiment.

Referring now to FIG. 1, there is shown a roll of the paper-backed pressure-sensitive adhesive tape according to the present invention which, as best understood from FIG. 2, comprises a backing paper 1, a widthwise stretched film 2, an adhesive layer 3 consisting of, e.g., polyethylene for lap-sealing the film 2 on the backing paper 1 therethrough, a layer 3' subjected to known pretreatment for anchoring, including corona discharge treatment and adapted for the application of the layer 3 thereon, a release layer 4 obtained by extrusion coating of polyethylene, a layer 4' subjected to known pretreatment for anchoring, including corona discharge treatment and adapted for forming the release layer 4, and a pressure-sensitive adhesive layer 5. It will be understood, however, that the layers 3' and 4' are not essential parts of the present invention.

The adhesive tape product prepared according to the present invention is particularly characterized in that the polyethylene release layer is applied to the surface of the widthwise stretched film, and the delamination strength of the backing paper is numerically limited.

As the backing paper used in the present invention, use is made of a sheet of paper used with the conventional kraft paper- or Japanese paper-backed adhesive tapes, ie., a sheet of paper having a delamination strength of 85 to 170 g/15 mm as mentioned hereinbefore.

The polyethylene used as the release agent is a low-density polyethylene having a density of at most 0.93 g/cm$^3$, which is coated at a temperature of 220° to 290° C. much lower than the conventional coating temperature of 300° to 320° C. with a view to depressing excessive increases in the adhesive properties due to the activation of the resin and reducing changes in the surface. The release layer thus obtained is hereinafter referred to as the polyethylene release layer.

As the widthwise stretched film, use is made of an elongate film of a high-density polyethylene having a density of at least 0.94 g/cm$^3$ obtained by stretching the film more than six times as its original width without permitting it to be positively stretched in the lengthwise direction such that the resultant film has a thickness of 0.01 to 0.05 mm.

On the other hand, a pressure sensitive adhesive layer composed mainly of polyacrylic ester is coated on the other side of the backing paper. Although the pressure-sensitive adhesive may be coated directly on the other side of the backing paper followed by drying, it is also possible to previously apply the pressure-sensitive adhesive on another release paper and, upon drying, transfer the resulting product to the other side of the backing paper.

A specified combination of the polyethylene release layer and the pressure-sensitive layer containing the polyacrylic ester as a main ingredient gives rise to a peel strength of at most 150 g/20 mm that is sufficient to prevent destruction of the tape due to delamination during its rewinding.

Thus, the present invention provides the paper-backed adhesive tapes which possess all the advantages of the cloth-backed adhesive tape. More specifically, according to the present invention, the peel strength between the polyethylene release layer and the pressure-sensitive layer composed mainly of the polyacrylic ester reaches a maximum value at a peel rate of at most 1 m/min. At a peel rate of 1 to 30 m/min, the peel strength has a tendency to drop contrarily to the general case, while it tends to converge on a certain value at 30 m/min up to 150 m/min. Except Japanese Patent Publication No. 20205/1976, no kraft paper-backed adhesive tapes that exhibit such behavior are disclosed in any prior disclosure whatsoever. That is to say, the peel strength of the conventional adhesive tapes have a tendency to increase and converge on a certain value at a peel rate of 0 to 30 m/min.

In general, the paper-backed adhesive tape is rewound at a rate of at least 80 m/min during the preparation thereof while it is unwound at a rate exceeding 30 m/min. The present invention takes advantage of the fact that the peel strength decreases to less than 150 g/20 mm within the above-mentioned peel rate range.

It has now been found that the paper-backed adhesive tape of the present invention can be unwound and rewound even at a high peel rate on the order of 150 m/min but without offering any disadvantage. It has also been found that this tape undergoes no destruction due to delamination even at a low peel rate of less than 30 m/min taking place at the beginning of rewinding, although its resistance to unwinding at a low peel rate is larger as compared with the ordinary paper-backed adhesive tape making use of silicone resin as a release agent.

According to the present invention, the polyethylene used as the release agent should preferably have a density of at most 0.93 g/cm$^3$, and it is required that the polyethylene be extruded through the outlets of die lips at a temperature of 220° to 290° C. In other words, it is possible to, on the one hand, extrude the low-density polyethylene at a relatively low temperature on the order of 220° to 290° C. and, on the other hand, combine it with the polyacrylate pressure-sensitive adhesive used as the pressure-sensitive adhesive, whereby a good peel property is obtained. At an extrusion temperature of at least 300° C. or a density exceeding 0.932 g/cm$^3$, the peel strength increases thus resulting in destruction of the tape due to delamination when it is unwound.

It is noted that since the widthwise stretched film is composed of polyethylene, the film displays highly satisfactory adhesion to the release layer also consisting of polyethylene, and can easily be coated thereon at a relatively low temperature on the order of 220° C. but without offering any disadvantage. In this way, it is possible to coat the polyethylene release layer directly on the widthwise strethed film; however, the film may be subjected in advance to the known radiation treatments such as corona discharge treatment and/or the known pretreatment for anchoring.

As the widthwise stretched film, use is preferably made of a high-density polyethylene film having a density of at least 0.94 g/cm$^3$ which is stretched at least six times as its original width without permitting positive stretching thereof in the lengthwise direction such that it has a thickness of 0.01 to 0.05 mm. However, a film stretched less than six times as its original width does not only possess a desired widthwise strength, but cannot also be linearly torn in the widthwise direction by hand. Accordingly, when a corrugated box is sealed by the tape using such a film, the sealed flaps thereof will possibly be unsealed by some shocks during transportation. In addition, widthwise tearing of the tape requires special equipment.

A variety of the widthwise stretched films were tested for the relationship between the widthwise strength and widthwise tearing, the results of which are set forth in Table 1.

TABLE 1

| Widthwise stretching ratio | Widthwise tensile strength (kg/10mm width) | Widthwise tear strength (g) | Determination of regularity of tear lines in the widthwise direction |
|---|---|---|---|
| 1 | 5.1 | 540 | X |
| 4 | 6.4 | 385 | △ |
| 6 | 9.5 | 310 | ○ |
| 8 | 11.0 | 285 | ○ |
| 10 | 12.4 | 290 | ○ |
| 12 | 12.7 | 280 | ○ |
| 14 | 13.0 | 280 | ○ |

As the widthwise stretched films set forth in Table 1, use was made of elongate polyethylene films flat die extruded under given conditions and stretched in the widthwise direction with the use of a widthwise stretching machine such as a tenter in such a manner that they has a thickness of 0.02 mm. The backing paper used for this purpose was a sheet of commercially available kraft paper having a weight of 73 g/m$^2$ and a delamination strength of 140 g/15 mm. The widthwise stretched film having a thickness of 0.02 mm and a density of 0.96 g/cm$^3$ was lap-sealed on one of the surfaces of the sheet by extrusion using as adhesives a low-density polyethylene having a thickness of 0.015 mm. On the widthwise stretched film was then extruded and coated a polyethylene having a density of 0.918 g/cm$^3$ and a melt index of 4.0 and serving as a release agent at an extrusion temperature of 275° C. prevailing at the outlets of die lips. On the opposite surface of the backing paper was coated a pressure-sensitive adhesive in an amount of 35 g/m$^2$, said adhesive being produced by Toyo Ink K.K. and available under the trade name "ORIBINE BPS 5127".

From Table 1, the polyethylene release agents having a thickness of from 0 up to 0.03 mm are found to have the quite same regularity of tear lines in the widthwise direction and the substantially same tensile and tear strength in the widthwise direction. It is understood that Table 1 gives the data about the polyethylene release agent having a thickness of 0.015 mm. The criteria for determining the regularity of tear lines in the widthwise direction are as follows:

Round mark showing that the regularity of tear lines in the widthwise direction substantially takes a linear form;

Triangle mark showing that about 10% of the regularity of tear lines does not display a linear form; and Cross mark showing that the regularity of tear lines takes no virtually linear form.

It is found from Table 1 that the films possess a strength sufficient to attain the desired purpose at a widthwise stretching ratio of more than six times and assume a certain value assuring that the paper-backed adhesive tape can linearly be torn by hand during the sealing operation without causing it to tear obliquely.

Turning now to the thickness of the widthwise stretched films used in the present invention, it has been found that the desired strength in the widthwise direction cannot be provided by the films having a thickness of at most 0.01 mm.

TABLE 2

| | Tensile Strength in the Widthwise Direction (kg/10 mm width) | | | |
|---|---|---|---|---|
| | Widthwise stretching ratio | | | |
| Thickness (mm) | 6 | 8 | 10 | 12 |
| 0.008 | 4.9 | 5.5 | 5.7 | — |
| 0.010 | 6.6 | 7.5 | 7.6 | 7.7 |
| 0.020 | 9.6 | 11.2 | 12.3 | 12.5 |
| 0.030 | 9.4 | 12.2 | 12.9 | 14.0 |
| 0.040 | 10.2 | 13.5 | 14.6 | 16.0 |
| 0.050 | 10.8 | 14.8 | 15.7 | 17.3 |

Note:
The tensile strength was measured in accordance with JIS Z-1523.

When the film's thickness exceeds 0.05 mm, on the other hand, the resultant tape loses flexibility with increases in strength, thus exhibiting unsatisfactory conformability with respect to an application surface. For example, when lap-sealing the tape on a corrugated container while folding it lengthwise along the edge or angular sections thereof, there is a fear that it often separates from or comes in no close contact with the application surface due to its strong restoring force. In addition, a larger thickness leads to a greater economical loss. Accordingly, the widthwise stretched films used in the present invention should preferably have a thickness of 0.01 to 0.05 mm. The widthwise stretched film may be readily and firmly adhered to the backing paper by lap-seal of a hot-extruded low-density polyethylene. However, use may be made of known pretreatments for improving adhesion of the polyethylene to the paper and known bonding methods using adhesives.

Needless to say, use of white or colored pigments together with the polyethylene results in the formation of a paper-backed adhesive tape the appearance of which exhibits white or other color. Further, it is possible to print a line of letters or marks in advance on the backing paper. The backing paper may be bleached or unbleached, or may be colored in advance.

The pressure-sensitive adhesives containing polyacrylate as a main component used in accordance with the present invention may be composed only of a polyacrylic ester. Alternatively, use may be made of a copolymer of a polyacrylic ester with at most 25% of vinyl monomers such as vinyl acetate, vinylidene chloride, methacrylate, acrylic acid, methacrylic acid or the like.

As the polyacrylates, esters of methyl, ethyl, butyl, 2-ethyl-hexyl or the like are generally used.

The pressure-sensitive layer used in the present invention should practically possess an adhesion strength of at least 500 g/20 mm and at most 3500 g/20 mm. At an adhesion strength of above this value, however, problems arise in unwinding of a tape wound upon itself.

The absence of any widthwise stretched film offers problems that, at an adhesion strength of 3500 g/20 mm, the backing paper delaminates and tears during the unwinding of a rolled tape. In accordance with the present invention, however, the tough widthwise stretched film is permitted to be present so that no problem arises at an adhesion strength up to 3500 g/20 mm.

It will be noted that the pressure-sensitive adhesive composed mainly of polyacrylate may optionally be added with tackifiers, plasticizers fillers, anti-aging agents, cross-linking agents etc.

As the backing paper used in the present invention, it is possible to employ the conventional backing paper having a delamination strength of 85 to 170 g/15 mm without subjecting it to any processing. It is of course preferred that the backing paper having a higher delamination strength is used; however, the backing paper having a delamination strength exceeding 170 g/15 mm should be called as the specialty paper rather than as the general-purpose paper. Such specialty paper is expensive and thus is not suited for use as the general backing paper adapted for the preparation of adhesive tapes.

Thus, it has been found that the above-mentioned conventional backing paper can sufficiently be used as a tape material at a delamination strength up to 85 g/15 mm due to the presence of the tough, widthwise stretched film.

It will be understood that when the delamination strength is less than 85 to 100 g/15 mm, the adhesion strength is preferably lower than 1000 g/20 mm.

The pretreatment agent for anchoring of polyethylene or the pressure-sensitive adhesive permeates the backing paper so that the original delamination strength on the order of less than 85 g/15 mm substantially exceeds 85 g/15 mm. Accordingly, the resultant tape can sufficiently be used as an adhesive tape.

One feature of the present invention resides in the fact that it is possible to make use of the general backing paper without the need of employing any specialty paper.

The present invention is characterized by the provision of the pressure-sensitive adhesive tapes that possess all the features and advantages from which the conventional paper-backed adhesive tapes are free.

In what follows, the features and advantages of the present invention will be enumerated.

(A) The adhesive tapes prepared according to the present invention are equivalent or superior to the cloth-backed adhesive tapes in a variety of properties such as widthwise tearing, lap-sealing, anti-slipping and ink-receptible properties as well as easy-to-unwindability withwise strength. In addition, use can be made of the general backing paper for the conventional kraft paper-backed adhesive tape. As a result, it is possible to prepare the novel paper-backed adhesive tapes equivalent or superior to the cloth-backed adhesive tapes at a manufacturing cost by far lower than that of the latter.

(B) As the backing paper, use can made of the backing paper for the general-purpose adhesive tapes due to the presence of the tough, widthwise stretched film. Nonetheless, the obtained tape can withstand a peel strength up to 150 g/20 mm exceeding 130 g/20 mm being the upper limit in the prior art.

(C) Due to the presence of the tough, widthwise stretched film the backing paper undergoes no destruction caused by delamination even at an adhesion strength up to 3500 g/20 mm exceeding the upper limit of 2000 g/20 mm in the prior art tapes, even though it consists of the backing paper for the general-purpose adhesive tapes.

(D) As the widthwise stretched film is formed of polyethylene, a very good adhesion thereof relative to the release agent also formed of polyethylene is obtained without the need of effecting the conventional reinforcing treatment or the like treatment.

According to the present invention, it is also feasible to apply an extrusion temperature in a wider range of 220° to 290° C. to the outlets of die lips during the extrusion coating as compared with the prior art where an extrusion temperature of above 250° C. is merely applicable.

In addition, it is possible to decrease the extrusion temperature to a considerable degree. Therefore, the peel strength is allowed to drop, thus resulting in greater improvements in the properties of the adhesive tape the backing paper of which undergoes no destruction due to delamination even when subjected to a greater force.

(E) Because of the presence of the tough, widthwise stretched film, the adhesive tape according to the present invention is sufficiently used without causing destruction of the backing paper due to delamination even when the lower limit of the delamination strength drops to 85 g/15 mm that is considerably lower than the prior art allowable lower limit of 120 g/15 mm.

Reference will now be made to a concrete comparison of the examples of the present invention and the control articles.

In what follows, the paper-backed adhesive tapes prepared according to the present invention will be compared with the commercially available paper adhesive tapes; the adhesive tape supported on a biaxially oriented polypropylene film, the cloth-backed adhesive tapes and the adhesive tapes prepared according to the teaching of Japanese Patent Application laid open for public inspection under No. 81543/1978 and Japanese Patent Publication No. 20205/1976.

TEST SAMPLES

1. Commercially Available Adhesive Paper Tape

In the pressure-sensitive adhesive used, natural rubber rather than polyacrylic ester is employed as a base polymer.

2. Biaxially Oriented Polypropylene-Backed Adhesive Tape that is commercially available 3. Paper-Backed Adhesive Tape Prepared According to the Teaching of Japanese Patent Application Laid Open for Public Inspection under No. 81543/1978

A high-density polyethylene having a density of 0.96 g/cm$^3$ is applied on one side of kraft paper having a delamination strength of 140 g/15 mm and a weight of 73 g/m$^2$ such that it is stretched 10 times as its original width without being positively oriented in the lengthwise direction, thereby forming a film having a thickness of 0.02 mm thereon. On the surface of this film is coated and cured silicone for release paper (manufactured and sold by Shinetsu Kagaku K.K. under the trade name of KS 772) in an amount of 0.7 g/m², while a pressure-sensitive adhesive composed mainly of polyacrylic ester (manufactured and sold by Saiden Kagaku K.K. under the trade name of X-54-3) is applied on the other side of the backing paper in an amount of 55 g/m².

4. Paper-Backed Adhesive Tape Prepared according to Japanese Patent Publication No. 20205/1976

One side of kraft paper is coated in advance with 0.05 g/m² with polyethylene imine for pretreatment for anchoring. Thereafter, on said side of the backing paper is extruded and coated a low-density polyethylene having a density of 0.920 g/cm³ and a melt index of 8.0 at a resin temperature of 275° C. prevailing at the outlets of die lips, thereby forming a release layer thereon. A pressure-sensitive adhesive composed mainly of polyacrylic ester (manufactured and sold by Saiden Kagaku K.K. under the name of EXP 5-51) is coated on the opposite surface of the backing paper in an amount of 30 g/m².

5. Commercially Available Cloth-Backed Adhesive Tape

In the pressure-sensitive adhesive used here, natural rubber rather than polyacrylic ester is employed as a base polymer.

6a. Paper-Backed Adhesive Tape Prepared according to the Present Invention

A high-density polyethylene having a density of 0.960 g/cm³ is stretched 10 times as its original width without being positively oriented in the longitudinal direction thereby to form a film having a thickness of 0.02 mm. The resulting film is laminated on one side of kraft paper having a delamination strength of 140 g/15 mm and a weight of 73 g/m² through a hot melt layer of extruded polyethylene having a melt index of 4.0. A low-density polyethylene having a density of 0.927 g/cm³ and a melt index of 8.0 which in extruded at a resin temperature of 275° C. at the outlets of die lips is applied on the surface of the widthwise stretched film which has been subjected to corona discharge treatment, thereby to form thereon a release layer being 0.018 mm in thickness. On the other side of the backing paper is coated a pressure-sensitive adhesive composed mainly of polyacrylic ester (manufactured and sold by Saiden Kagaku K.K. under the trade name of X-54-3) in an amount of 55 g/m².

It should be noted that the widthwise stretched film used in sample 4 or 6 comprises polyethylene film extruded from flat die under the given conditions, which is in turn oriented in the widthwise direction by means of a suitable widthwise stretcher such as a tenter such that it has a predetermined thickness.

6b. Paper-backed Adhesive Tape Based on the Present Invention

A widthwise stretched film obtained by stretching a high-density polyethylene of a density of 0.94 g/cm³ 8 times as its original width without being positively oriented in the lengthwise direction such that it has a thickness of 0.020 mm is laminated on one surface of kraft paper having a delamination strength of 125 g/15 mm and a weight of 73 g/m² through a hot melt layer of extruded polyethylene having a density of 0.918 g/cm³ and a melt index of 4.0. The aforesaid film is then subjected to corona discharge treatment, and is coated with a low-density polyethylene having a density of 0.918 g/cm³ and a melt index of 4.0 at a resin temperature of 290° C. prevailing at the outlets of die lips by extrusion thereby to form thereon a release layer having a thickness of 0.025 mm. A pressure-sensitive adhesive composed mainly of polyacrylic ester (manufactured and sold by Saiden Kagaku K.K. under the trade name of X-54-3) is coated on the opposite surface of the backing paper.

6c Paper-Backed Adhesive Tape Based on the Present Invention

A widthwise stretched film obtained by stretching a high-density polyethylene having a density of 0.95 g/cm³ six times as its original width without being positively oriented in the lengthwise direction such that it has a thickness of 0.020 mm is laminated on one surface of kraft paper having a delamination strength of 120 g/15 mm and a weight of 73 g/m² through a hot melt layer of extruded polyethylene having a density of 0.918 g/cm³ and a melt index of 4.0, and the widthwise stretched film is subjected to corona discharge treatment. Thereafter, 0.5 g/m² of a ethylene/acrylic acid copolymer is coated on the film as a pretreatment agent for anchoring. A low-density polyethylene having a density of 0.916 g/cm³ and a melt index of 4.5 is extruded and coated at a resin temperature of 220° C. prevailing at the outlets of die lips to form a release layer having a thickness of 0.020 mm. A pressure-sensitive adhesive composed mainly of polyacrylic ester (manufactured and sold by Saiden Kagaku K.K. under the trade name of X-54-3) is coated on the opposite surface of the backing paper in an amount of 45 g/m².

6d Paper-Backed Adhesive Tape Based on the Present Invention

A widthwise stretched film obtained by stretching a high-density polyethylene having a density of 0.95 g/cm³ 8 times as its original width without being positively oriented in the lengthwise direction such that it has a thickness of 0.020 mm is laminated on one surface of Japanese paper for the Japanese paper-supported adhesive tape having a delamination strength of 85 g/15 mm and a weight of 30 g/m² through a hot melt layer of extruded polyethylene a density of 0.918 g/cm³ and a melt index of 4.0, and the widthwise stretched film is subjected to corona discharge treatment. On the surface of the film is extruded and coated a low-density polyethylene having a density of 0.918 g/cm³ and a melt index of 4.0 at a resin temperature of 280° C. at the outlets of die lips to form thereon a release layer having a thickness of 0.015 mm. A pressure-sensitive adhesive composed mainly of polyacrylic ester (the same agent as used in the previous examples) is coated on the opposite surface of the backing paper in an amount of 20 g/m².

RESULTS

Measurements were carried out on the tensile strength, delamination strength, adhesion strength of the pressure-sensitive strength, peel strength and coefficient of static friction. Measurements were also performed on the various properties of the adhesive tapes under test, such as widthwise tearing property, lap-sealing property, unwinding property, slip resistance and ink-receptible property of the tape back, widthwise strength etc. These measurements were then qualitatively determined.

Since it was sometimes found that the adhesive tape was rewound during the preparation thereof, the rewind test was carried out. The results are compiled in Table 3.

TABLE 3

| Experimental Item | Sample 1<br>Commercially Available Adhesive Paper Tape | Sample 2<br>Commercially Available Adhesive of Biaxially Oriented Polypropylene | Sample 3<br>Paper-Backed Adhesive Tape Prepared According to the Teaching of Japanese Patent Application Laid Open for Public Inspection under No. 81543/1978 | Sample 4<br>Paper-Backed Adhesive Tape Prepared According to Japanese Patent Publication No. 20205/1976 | Sample 5<br>Commercially Available Cloth-Backed Adhesive Tape | Sample 6-a<br>Paper-Backed Adhesive Tape Prepared According to the Present Invention | Sample 6-b<br>Paper-Backed Adhesive Tape Based on the Present Invention | Sample 6-c<br>Paper-Backed Adhesive Tape Based on the Present Invention | Sample 6-d<br>Paper-Backed Adhesive Tape Based on the Present Invention |
|---|---|---|---|---|---|---|---|---|---|
| Tensile Strength MD kg/15mm | 8.0 | — | 9.0 | 8.5 | 17.0 | 9.5 | 9.5 | 9.5 | 5.0 |
| Tensile Strength CD kg/15mm | 5.0 | — | 18.5 | 5.0 | 15.5 | 19.5 | 19.5 | 19.5 | 16.5 |
| Delamination Strength g/15mm | 140 | Impossible to measure | 140 | 140 | Impossible to measure | 140 | 125 | 120 | 85 |
| Adhesion Strength g/20mm | 1200 | 1800 | 3500 | 1800 | 900 | 3500 | 2000 | 3000 | 600 |
| Peel Strength g/20mm | 100 | 900 | 90 | 70 | 1300 | 150 (230) | 80 | 80 | 60 |
| Static Friction Coefficent of | 0.15 | 0.5 | 0.15 | 0.5 | 0.5 | 0.6(0.6) | 0.6 | 0.6 | 0.6 |
| Widthwise Tearing Property | X | X | ⊚ | X | ⊚ | ⊚ (○) | ⊚ | ⊚ | ⊚ |
| Unwinding Property | ⊚ | X | ⊚ | ○ | X | ○ (△) | ○ | ○ | ○ |
| Lap-Sealing Property | X | ⊚ | X | ⊚ | ⊚ | ⊚ ⊚ | ⊚ | ⊚ | ⊚ |
| Slip Resistance | X | ⊚ | X | ⊚ | ⊚ | ⊚ ⊚ | ⊚ | ⊚ | ⊚ |
| Ink-Receptible Property | X | ⊚ | X | ⊚ | ⊚ | ⊚ (⊚) | ⊚ | ⊚ | ⊚ |
| Widthwise Strength | △ | △ | ⊚ | △ | ⊚ | ⊚ (○) | ⊚ | ⊚ | ⊚ |
| Rewind Test | ⊚ | X | ⊚ | ⊚ | X | ⊚ | ⊚ | ⊚ | ⊚ |

⊚: Very Good
○: Good
△: Somewhat Poor
X: Poor

WIDTHWISE TEARING PROPERTY

The adhesive tapes shown at 3, 5, 6a, 6b, 6c and 6d have been found to be excellent in this property and, in particular, the tapes shown at 6a, 6b, 6c and 6d have been found to be equivalent or superior in this property to the cloth-backed adhesive tape 5 due to the influence of the widthwise stretched film.

UNWINDING PROPERTY

Like the adhesive tape as disclosed in Japanese Patent Publication No. 20205/1976, the peel strength reached a maximum value at a peel rate of less that 1 m/min, and decreased at 1 to 30 m/min. At 30 to 150 m/min, the peel strength converged on a certain value. From the date set forth in Table 3, it has been found that the tapes 6a, 6b, 6c and 6d of the present invention are superior to the cloth-backed adhesive tape 5 in the unwinding property that permits easy peeling and unwinding of the tape.

LAP-SEAL PROPERTY

As the release agent is polyethylene, the adhesive tapes 6 of the present invention excel in this property like the cloth-backed adhesive tape 5. As will be understood from the data given about the coefficient of static friction in Table 3, the adhesive tapes 6 of the present invention are by far superior to samples 1 and 2, and are equivalent to sample 5 in the slip resistance.

INK-RECEPTIBLE PROPERTY

As the release agent is polyethylene, the adhesive tapes 6a, 6b, 6c and 6d of the present invention have a satisfactory ink-receptible property like samples 2, 4 and 5. Samples 1 and 3 exhibit no ink-receptible property since the release agent is silicone.

WIDTHWISE STRENGTH

As will be understood from the tensile strength (CD), the adhesive tapes 6a, 6b, 6c and 6d are equivalent in this property to the cloth-backed adhesive tape 5.

REWIND TEST

Test samples 1, 2, 3, 4, 5 as well as 6a, 6b, 6c and 6d were examined for unwinding and rewinding on a rewinder.

Samples 1, 3, 4, 6a, 6b, 6c and 6d could smoothly be unwound and rewound at a rate of 0.5 to 150 m/min.

In sample 2, however, the tape material tore and broke at a rate of about 100 m/min, and thus could not be rewound. It has been found that, upon winding at a rate of 150 m/min, the release layer on the cloth back release and breaks in a spot-like state and is transferred to the pressure-sensitive adhesive layer.

Samples 6a, 6b, 6c and 6d were subjected to the like rewind test after each tape having a width of 50 mm and a length of 50 m has been wound upon itself and heated for 24 hours at 70° C.

Samples 6a, 6b, 6c and 6d could smoothly be unwound and rewound at a rate of 0.5 to 150 m/min, and were found to retain the same delamination strength before and after the test.

As mentioned above, the adhesive tapes 6a, 6b, 6c and 6d are equivalent or superior to the cloth-backed tape 5 in all the properties. The polyethylene/cloth/pressure-sensitive adhesive structure 5 as expensive as compared with the polyethylene/paper/pressure-sensitive adhesive structure 6 since the paper is a cheaper material. As the amount of the pressure-sensitive adhesive used in 6 is much smaller than that used in 5, the adhesive tapes 6 are still advantageous even though taking use of the widthwise stretched film into consideration.

Using paper as the backing material facilitates processing and simplifies the preparation steps, thus resulting in great economical advantages, since the paper can be processed more easily than the cloth material.

In the adhesive tape fields, there is an application field where the tensile strength and adhesion strength attained by 5 are not actually required. For example, the tapes for masking or packaging light articles belong to such a field, for which the adhesive tape 6d is designed. As compared with the cloth-backed adhesive tape adapted for this purpose, it has been found that the adhesive tape 6d exhibits the properties equivalent or superior to those of the latter.

It should be noted that the paper-backed adhesive tape in which the widthwise stretched film itself is used as the release layer instead of the silicone in 5 displays extraordinarily high peel strength but extremely poor unwinding property.

It should also be noted that the paper-backed adhesive tape in which the pressure-sensitive adhesive used in 5 is replaced by that used in 6a exhibits so extraordinarily high peel strength that it is not unwindable.

It has been found that the paper-backed adhesive tape obtained by extruding the polyethylene release layer at a resin temperature of 300° C. at the outlets of die lips exhibits high peel strength and somewhat poor unwinding property. The widthwise stretched film in this tape possessed unsatisfactory stretching property and the tape was therefore somewhat poor in the widthwise tearing property and widthwise strength, since the widthwise stretched film was exposed to a temperature as high as 300° C.

The results are set forth in the bracketed column in item 6a in Table 3.

The reasons why such results are obtained resides in the fact that the above-mentioned control examples partially depart from the scope defined in the present invention.

Reference will now be made to the method for measuring the adhesion strength of the above-mentioned pressure-sensitive adhesives, and the delamination strength, peel strength, tensile strength and coefficient of static friction of the backing paper.

1. Adhesion Strength

According to the measuring method entitled "Adhesive force relative to test plate" with the use of the peeling method of JIS C 2107.

2. Delamination Strength

The test samples were subjected to moisture conditioning at 20° C. and 65% RH for at least 4 hours according to JIS P 8111. Each of the resultant samples was cut to form a test piece of about 25 cm × 15 mm, which was in turn scored in the widthwise direction to a depth about half the paper layer, thus allowing the piece to delaminate in the longitudinal direction.

Upon the commence of delamination, both ends of the piece were allowed to further delaminate at a right angle and at a rate of pulling of 300 mm/min (corresponding to the peel strength of 150 mm/min). The delamination strength is then expressed in g/15 mm as the average load applied.

3. Peel Strength

The paper-backed adhesive tape under test was lapped at its back on the pressure-sensitive adhesive, and the resultant product was cut to form a test piece of about 45 cm × 20 mm. The test piece was let alone under a load of 80 g/cm³ at 20° C. for 10 days. The tape back and the adhesive were stripped from each other at a right angle and at a peel rate of 30 m/min (corresponding to the rate of pulling of 60 m/min). The peel strength is then expressed in g/20 mm as the average load applied.

4. Tensile Strength

The tensile strength is Table 3 is expressed in kg/15 mm according to JIS P 8113.

The tensile strength in Tables 1 and 2 is expressed in kg/10 mm according to JIS Z 1523.

5. Coefficient of Static Friction

The test adhesive tape is laminated on a slant plane with a variable angle, the back of said tape being turned upwardly. On the other hand, another test piece of 3×5 cm cut from the same tape is accurately laminated on the smooth bottom of a rectangular plate of the same size.

This plate is placed on said plane such that the back of the piece laminated on the former contacts the back of the piece laminated on the latter. In this case, the plate is positioned such that its longitudinal direction corresponds to that of said plane. The plane is allowed to slant gradually until the plate having a weight of 1 kg and the adhesive tape laminated on its bottom slips down thereon at an angle of alpha ($\alpha$). The coefficient of static friction is then expressed in tangent alpha ($\alpha$). The measurement is to be effected at 20°±1° C. and 65±5% RH.

6. Tear Strength

This strength is expressed in g according to JIS L 1004.

What we claim is:

1. A paper-backed adhesive tape of the pressure-sensitive type comprising a backing paper, a widthwise stretched film lap-sealed on one side of said backing paper through an adhesive layer, a release layer obtained by coating polyethylene on the surface of said film by extrusion, and a pressure-sensitive adhesive layer laminated on the other side of said backing paper.

2. The tape as claimed in claim 1, in which said backing paper has a delamination strength of 85 to 170 g/15 mm.

3. The tape as claimed in claim 1, in which said widthwise stretched film consists of high-density polyethylene film having a density of at least 0.94 g/cm³ and stretched more than six times as its original width without being positively oriented in the lengthwise direction so as to have a thickness of 0.01 to 0.05 mm.

4. The tape as claimed in claim 1, in which said release layer consists of a low-density polyethylene having a density of at most 0.93 g/cm³ applied at a resin temperature of 220° to 290° C. prevailing at the outlets of die lips.

5. The tape as claimed in claim 1, in which the amount of said pressure-sensitive adhesive coated is so adjusted as to provide an adhesion strength of 500 to 3500 g/20 mm.

6. The tape as claimed in claim 1, wherein a peel strength between said release layer and said adhesive layer is at most 150 g/20 mm.

7. A process for the preparation of paper-backed adhesive tapes of the pressure-sensitive type comprising the steps of lap-sealing a widthwise stretched film on one side of a backing paper, extruding and coating polyethylene on the surface of said film to form a release layer thereon and coating a pressure-sensitive adhesive composed mainly of polyacrylic ester on the other side of the backing paper.

8. A process as claimed in claim 7, wherein said backing paper has a delamination strength of 85 to 170 g/15 mm.

9. A process as claimed in claim 7, wherein said widthwise stretched film consists of high-density polyethylene film having a density of at least 0.94 g/cm³ and stretched more than six times as its original width without being positively oriented in the lengthwise direction so as to have a thickness of 0.01 to 0.05 mm.

10. A process as claimed in claim 7, wherein said release layer consists of a low-density polyethylene having a density of at most 0.93 g/cm³ applied at a resin temperature of 220° to 290° C. prevailing at the outlets of die lips.

11. A process as claimed in claim 7, wherein the amount of said pressure-sensitive adhesive coated is so adjusted as to provide an adhesion strength of 500 to 3500 g/20 mm.

12. A process as claimed in claim 7, wherein a peel strength between said release layer and said adhesive layer is at most 150 g/20 mm.

* * * * *